Patented Nov. 8, 1932

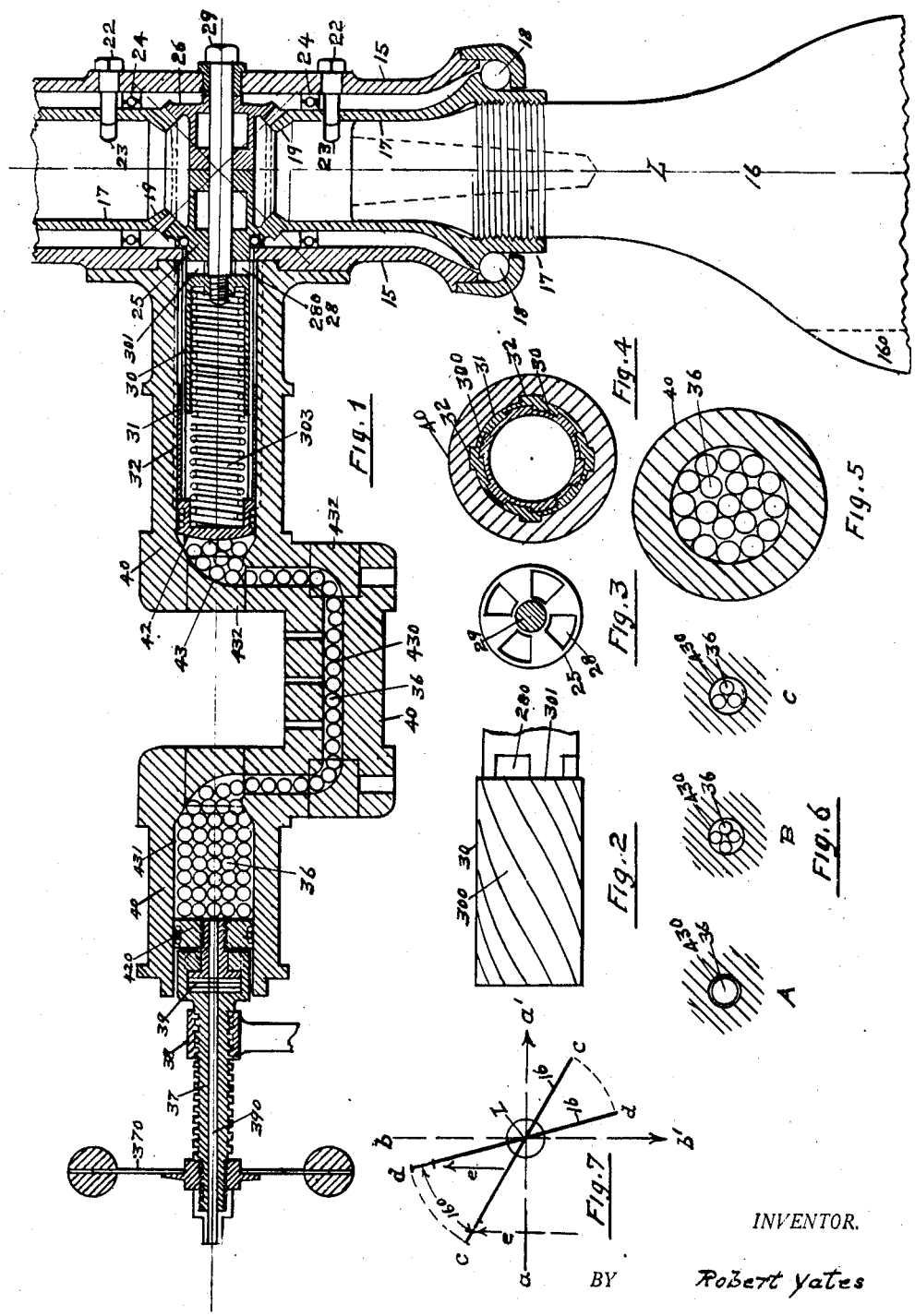

1,887,053

UNITED STATES PATENT OFFICE

ROBERT YATES, OF PASSAIC, NEW JERSEY

PROPELLER AND ENGINE JOINTLY FOR AEROPLANES

Application filed December 29, 1931. Serial No. 583,666.

This invention relates to variable pitch propellers, variable in flight, and in which the engine shaft is also the propeller shaft and which in this improvement, embodies the essential mechanism controlling the operation of the propeller.

The principal and distinctly new features embodied in this invention and on which Letters Patent is respectfully requested are:—

First: Means in the form of balls for conveying a positive pressure and movement through a tortuous duct or channel within a rotating propeller and engine shaft, and at the same time permitting a lubricating fluid to pass through the channel around the balls to be drawn off for lubricating purposes.

Second: Means for increasing the pitch angle of the blades of a rotating aeroplane propeller, manually, through a tortuous propeller and engine shaft, then decreasing the pitch again, automatically, but under manual control.

Third: Means for curving the intersections of a channel or duct in a tortuous engine and propeller shaft to permit the free passage of metallic balls through the duct.

A propeller embodying these and other features is herewith illustrated and described.

By reference to the drawing illustrating this invention it will be seen that there is a similarity of the parts and design, to my former invention, Serial No. 366,796, dated May 29, 1929, and for the purpose of comparison the reference numbers on the drawing of the corresponding parts of the two inventions are made the same, the operation of the two propellers is, however, distinctly different, viz:

In my former invention (Serial No. 366,796) the pitch angle of the blades is increased automatically by the torsional power of helical springs. In my present invention the pitch angle of the blades is increased, manually, through mechanism within the engine shaft, as specified below.

In my former invention (Serial No. 366,796) the automatic operation of the propeller is separable from the manual operation, while in flight, by withdrawing the operating cylinder, 31, from the telescoping cylinder, 30, until the coupling, 28 and 280, parts, as described in the relative specification. In my present invention the coupling, 28—280, is firmly coupled by the spindle bolt, 29, and the propeller is operated, manually only, to increase the pitch angle of the blades, (the pitch angle is then decreased again in both of these inventions by pressure of the air on the trailing edge of the rotating blades).

Describing the drawing hereto attached.

Fig. 1 shows the propeller connected directly to a short engine shaft, 40, having only one crank. This shaft is hollow at both ends and the chambers, 43—431, so formed are connected through the intervening crank, or cranks, by a duct or channel, 430. There is a piston-head in each end chamber and the chambers and duct between these pistons are filled with a lubricating fluid and metallic balls, 36. The piston, 420, at the rear end of the shaft is connected to a handwheel, 370, and screw, 37, and the piston, 42, at the forward end is connected to the outer cylinder, 31, of the telescoping and operating cylinders, 30—31, so that pressure put on the piston, 420, by the handwheel-screw, 37, is transmitted through the metallic balls, 36, and lubricating fluid to the piston head, 42, driving the outer operating cylinder, 31, longitudinally forward, and turning the inner telescoping cylinder, 30, laterally, then through the equalizing gears, 25, 26 and 19, the blades, 16, are caused to turn axially and increase their pitch angle accordingly, and against the counteracting pressure of air on the eccentric area, 160, on the trailing edge of the rotating blades. Fig. 1, also shows a spring, 303, designed to reduce the pitch angle of the blades back to normal when the propeller stops rotating, and the piston, 420, is drawn back by the screw, 37.

Fig. 2 indicates the twist of the helical ribs and grooves cut on the shell of the inner operating cylinder, 30, also shows the coupling, 28—280, connecting this cylinder, 30, with the pinions and equalizing gear of the propeller.

Fig. 3 shows one half, 28, of the coupling, 28—280, cut on the end of the pinion, 25.

Fig. 4 shows a cross-section, cut through the cylinders, 30—31, when they are telescoped one into the other.

Fig. 5 is a cross-section of either chamber, 43 or 431, showing the preferred proportionate size of the balls, 36, so they will pass through the ducts, 430, in single file.

Fig. 6; (A) shows a cross-section of the duct, 430, with the balls in single file; (B) and (C) shows four and three small balls, respectively, abreast in the duct, 430.

Fig. 7 illustrates the action of the air pressure, on an eccentric area, 160, on the trailing edge of the blades of a rotating propeller:— a to a', indicates the line of flight. b to b', indicates the plane of rotation. c—c, represents a section of a blade at its great pitch angle. d—d, represents a section of a blade at its lesser pitch angle. 160, represents the outlying eccentric area on the trailing edge of the blades, and the arrows, e—e, indicate the line of air pressure on this eccentric area when the propeller is rotating over from b to b', and causing the blades to turn on their axis, L, from their great pitch c—c, to their lesser pitch d—d.

In the drawing the figures indicate the parts as follows, and similar characters refer to similar parts in the several views.

15, Fig. 1, indicates the hub piece of the propeller.

16, Fig. 1, shows a part of a blade with the shank screwed into the sleeve, 17, and for illustration, shows the broad side of the blade toward us with a greater area, 160, on the trailing side of the axial center line, L, than on the leading side.

17, Fig. 1, refers to sleeves, holding the shanks of the blades, and connecting them with the equalizing gears 19, 25 and 26.

18, Fig. 1, is a ball thrust bearing holding the sleeves, 17, and blades, 16, within the propeller hub, 15.

19—19, Fig. 1, are gears on the sleeves, 17, which with the pinions, 25 and 26, constitute the equalizing gears.

22—22, Fig. 1, are stop bolts set in the hub, 15, and penetrating into the slots, 23, in the wall of the sleeves, 17, to limit the turning movement of the sleeves and blades.

24, Fig. 1, refers to small ball bearings easing the turning movement of the sleeves, 17.

25, Fig. 1, is the principal pinion of the equalizing gears.

26, Fig. 1, is an auxiliary pinion of the equalizing gears turning freely on the spindle-bolt, 29.

28—280, Figs. 1—2—3, is a jaw coupling connecting the operating cylinders, 30—31, in the joint, engine and propeller shaft, 40, with the equalizing gears, 25—26—19, in the propeller hub, 15; one half of the coupling, 280, is cut on the head, 301, of the inner operating cylinder, 30, and the other half, 28, is cut on the hub of the pinion, 25, of the equalizing gears.

29, Figs. 1 and 3, is a spindle bolt piercing the hub of the propeller, 15, and pinions of the equalizing gears, 25—26, and is then screwed firmly into the head of the inner operating cylinder, 30, thus tying the operating cylinders, 30—31, to the equalizing gears and blades of the propeller.

30, Figs. 1—2 and 4, is the inner cylinder of the operating cylinders, having spiral ribs, 300, on the outside of the cylinder, cut to fit and slide in corresponding spiral grooves, 300, cut on the inner side of the outer cylinder, 31.

31. Figs. 1 and 4, is the outer cylinder of the operating cylinders having longitudinal ribs, 32, on the outside of the cylinder, fitted to slide in corresponding longitudinal grooves, 32, cut on the inside of the shaft 40.

36, Fig. 1, is a mass of metallic balls filling the chambers, 43—431, and duct 430, and designed to convey a positive pressure from the piston head, 420, to the piston head, 42.

370—37, Fig. 1, shows a handwheel and screw connected to the piston head, 420, through a swivel joint, 39.

38, Fig. 1, is a fixed abutment threaded to engage the screw, 37.

39, Fig. 1, refers to a swivel joint connecting the stationary handwheel-screw, 37, with the rotating engine shaft, 40, and 390 is an oil duct through the screw, 37, to the chambers and channels within the shaft.

40, Fig. 1, refers to the engine shaft which is also the propeller shaft.

42, Fig. 1, is a piston head in the forward chamber, 43, and is connected with the outer cylinder, 31, of the telescoping, operating, cyinders, 30—31.

43, Fig. 1, is the forward chamber and 431 is the rear chamber in the shaft 40, housing the balls and lubricating fluid, 36, within the shaft.

430 is a duct connecting the chambers, 43 and 431; 432 refers to metallic insets facilitating the construction of rounded corners in the duct, 430.

*Operation*

Referring to Fig. 7 it is seen that the blades, 16, have a greater area, 160, on the trailing side, L—c, L—d, of the axial center, L, than on the leading side and when the propeller is rotated the excess pressure of air on this excess area, 160, tends to reduce the pitch angle and turn the blades on their axis, L, from a position, c—c, of great pitch (relative to, b—b') to a position of lesser pitch, d—d, thus decreasing the pitch angle of the blades automatically. The pitch angle is then increased, against this automatic decrease, by manual operation of the handwheel and screw, 370 and 37, through the mechanism within the engine shaft, 40, and hub, 15, of the propeller, as described in the foregoing specification. An auxiliary compression spring, 303, is set within the telescoping cylinders, 30—31, to reduce the pitch angle of the blades from c—c to d—d, Fig. 7, when the propeller stops rotating and the air pressure on the eccentric area, 160, of the blades ceases. The spring is shown fully extended and the telescoping cylinders also extended, showing the balls, 36, driven back through the duct, 430, into the rear chamber, 43. In this position the handwheel-screw, 37, is drawn back the full limit, as shown on Fig. 1, and the blades stand at their minimum pitch as shown by, d—d, Fig. 7.

What I claim in this invention as new and useful and meriting Letters Patent is:—

1. In a tortuous engine and propeller shaft having a channel through the center for lubricating purposes, means for conveying a positive continuous pressure and movement from one body to another through the shaft and channel, by having the channel filled with metallic balls, and a lubricating fluid flowing freely between and around the balls.

2. In a rotating aeroplane propeller having a tortuous shaft, means for varying the pitch angle of the blades, manually, while in flight, by having a channel through the shaft with a chamber at each end of the channel; metallic balls filling the chambers and channel and a lubricating fluid flowing freely between and around the balls; a piston-head in the rear end chamber connected with means for moving this piston forward and backward, and a second piston-head in the forward end chamber connected with the blades of the propeller through rotative mechanism within this chamber and within the hub of the propeller; so that a forward movement of the rear piston in the rear chamber is transmitted through the balls and fluid to the forward piston and mechanism in the forward chamber, causing the equalizing gears and blades in the propeller hub to turn and increase the pitch angle of the blades accordingly, and against a counter-acting pressure of air on the trailing edge of the blades, which pressure is constantly tending to decrease the pitch.

3. In a tortuous engine and propeller shaft having an angular channel or duct, bored through its center; means for curving the angular intersections of the several bores to permit the free passage of balls through the duct; by connecting the bores at each intersection through a metallic inset having a curve of the duct within the inset.

ROBERT YATES.